United States Patent [19]

Sobti

[11] Patent Number: 5,280,650
[45] Date of Patent: Jan. 18, 1994

[54] DSP BASED RADIO WITH DIMINISHED POWER REQUIREMENTS

[75] Inventor: Arun Sobti, Wheaton, Ill.

[73] Assignee: Motorola, Inc., Schaumburg, Ill.

[21] Appl. No.: 985,536

[22] Filed: Dec. 3, 1992

Related U.S. Application Data

[63] Continuation of Ser. No. 770,843, Nov. 25, 1991, abandoned, which is a continuation of Ser. No. 325,603, Mar. 20, 1989, abandoned.

[51] Int. Cl.⁵ .............................................. H04B 1/16
[52] U.S. Cl. .................................. 455/343; 455/38.3
[58] Field of Search ............... 455/127, 214, 225, 229, 455/343, 335, 38.3, 140, 89, 90; 340/311.1, 825.44

[56] References Cited

U.S. PATENT DOCUMENTS

| | | | |
|---|---|---|---|
| 4,384,361 | 5/1983 | Masaki | 455/31 |
| 4,768,031 | 8/1988 | Mori et al. | 455/343 |
| 5,027,428 | 6/1991 | Ishiguro et al. | 455/343 |
| 5,058,203 | 10/1991 | Inagami | 455/343 |

Primary Examiner—Reinhard J. Eisenzopf
Assistant Examiner—Edward Urban
Attorney, Agent, or Firm—Joseph P. Krause

[57] ABSTRACT

A radio having two signal processing paths, one including a digital signal processor that consumes a relatively large amount of power and one including a signal processor that consumes a relatively small amount of power. The low power processor operates to monitor for broadcast signals of interest. Upon detecting such a signal, the low power processor enables the digital signal processor to facilitate proper signal processing.

4 Claims, 1 Drawing Sheet

DSP BASED RADIO WITH DIMINISHED POWER REQUIREMENTS

This is a continuation of application Ser. No. 07/770,843, filed Nov. 25, 1991 and now abandoned, which is a continuation of application Ser. No. 07/325,603 filed Mar. 20, 1989, now abandoned.

TECHNICAL FIELD

This invention relates generally to radios, and more particularly to radios that include a digital signal processor.

BACKGROUND ART

Radios generally function to receive broadcast signals. Usually, the user of a radio will not be interested in all of the signals that are broadcast on a communication resource (such as a particular frequency or a particular TDM time slot). Since many broadcast signals of interest include an identifying signal or other identifying indicia, many radios include a signal processor that examines the received broadcast signal to determine the presence of the identifying signal. If present, the radio can be further enabled to render the broadcast signal audible, visible, or otherwise as appropriate for that particular broadcast signal.

For example, some radios remain squelched unless a carrier can be sensed on a particular monitored communication resource. Other broadcast signals include special identifying signals, such as tone signals or subaudible digital signals, that the radio can recognize and respond to. Yet other signals of interest can be prefaced with a specific identifying preamble, such as an ID for the intended radio.

In order to expand the capabilities and flexibility of radios, digitizers and digital signal processors (DSPs) have been used. These processors typically receive digitized received signals. Further processing of the signal, equivalent to IF and discriminator processing, then occurs in the DSP in a digital manner. The resultant signal can then be converted into analog form and processed further as appropriate. For example, the resultant signal may be rendered audible in the case of a voice transmission.

DSPs, however, consume a significant amount of power when operating. This becomes a particular problem when seeking to use a DSP in a portable radio with limited power resources. DSP power consumption becomes of particular concern when the DSP operates both in the presence and absence of a broadcast signal of interest. Typically, the DSP must operate even in the absence of a broadcast signal of interest because the DSP itself aids in detecting the presence of a broadcast signal of interest. Unless the broadcast signals of interest occur at known times, the DSP must remain active in order to detect the signal when it occurs.

SUMMARY OF THE INVENTION

This invention allows a DSP to be used in a ratio while avoiding the necessity of continuous DSP operation.

The invention includes generally two signal processing units; the first includes the DSP and the second includes a processing unit having lesser capabilities and smaller power requirements. The DSP based signal processing unit functions to fully process broadcast signals of interest. The low power processing unit functions to detect the presence of a broadcast signal of interest, and upon detecting such a signal, the low power processing unit enables the DSP based processing unit to begin functioning.

Through use of this invention, the high power requirements of the DSP based processing unit are necessitated only when a broadcast signal of interest exists. Otherwise, a lower power broadcast signal of interest detection mechanism monitors the communication resource.

BEST MODE FOR CARRYING OUT THE INVENTION

Figure 1:
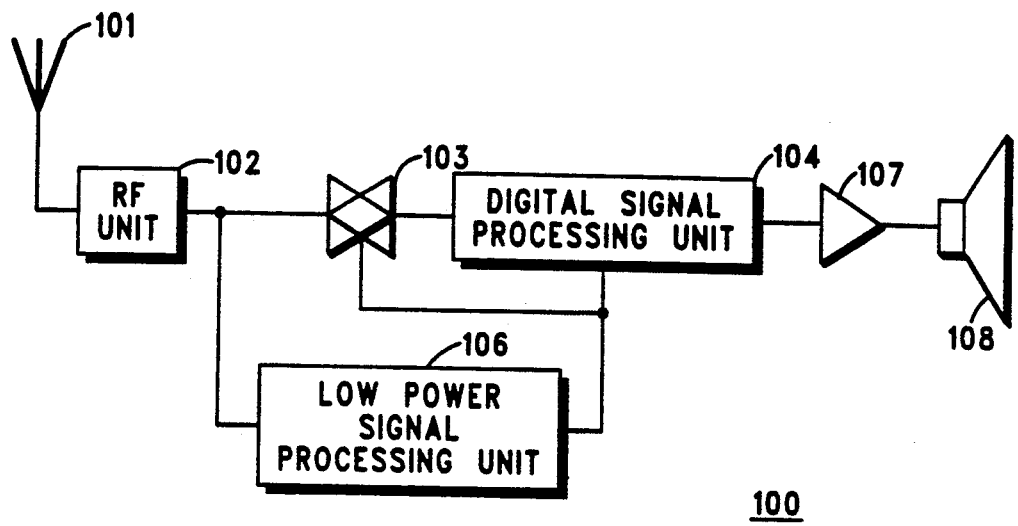
FIG. 1 comprises a block diagram depiction of the invention.

Referring to FIG. 1, a radio (100) includes generally an antenna (101) for receiving broadcast signals and an RF unit (102) for appropriately processing the received broadcast signals. The received signals are then passed to a low power signal processing unit (106) and also through an appropriate gate (103) to a digital signal processing unit (104) (the latter typically including a DSP such as the Motorola 56000 and a microprocessor to control the DSP). The output of the digital signal processing unit (104) then couples to an appropriate amplifier (107) and speaker (108) or other output devices as appropriate to the type of message received.

Figure 2:
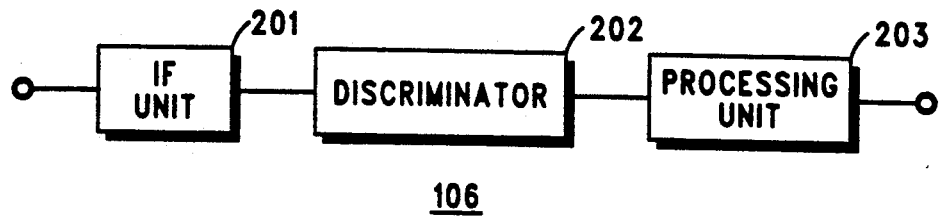
FIG. 2 comprises a block diagram depiction of the low power signal processing unit.

With reference to FIG. 2, the low power signal processing unit (106) includes an appropriate IF unit (201) for receiving the output signal from the RF unit (102), a discriminator (202) for processing the IF unit (201) output to aid in recovering the original modulating signal, and a processing unit (203) for examining the recovered signal and determining whether an appropriate identifying signal is present. The processing unit (203) could be any relatively simple and low power device, such as a Motorola MC6303 processor.

Upon detecting the presence of a broadcast signal of interest, the processing unit (203) of the low power signal processing unit provides a signal to the gate (103), thereby allowing the RF signal to be provided to the digital signal processing unit (104). At the same time, the processing unit (203) provides an enable signal to the digital signal processing unit (104) to activate that unit and cause it to begin processing the incoming signal.

So configured, the digital signal processing unit will operate only when a broadcast signal of interest can be detected. Otherwise, the low power signal processing unit will monitor the received broadcast signals and control the activation of the digital signal processing unit as a function of the presence and absence of a broadcast signal of interest.

I claim:

1. In a radio having a signal receiving means for receiving radio frequency broadcast signals, and a digital signal processing means, receiving radio frequency signals from said receiving means, that requires a first amount of power to operate for converting the received broadcast signals into a first signal, an improvement comprising:

A) switch means:
   responsive to an enabling control signal; and being operably coupled between the signal receiving means and the digital signal processing means;

for selectively allowing the broadcast signal as received by the signal receiving means to be provided to the digital signal processing means;

B) low power signal processing means:

operably coupled to the signal receiving means and receiving radio frequency signals from said signal receiving means; and requiring a second amount of power, said second amount of power being less than the first amount of power;

for detecting a radio frequency broadcast signal of interest independent of the digital signal processing means and providing the enabling control signal to the switch means and the digital signal processing means in response thereto for activating the digital signal processing means and allowing the received broadcast signals to be provided to the digital signal processing means.

2. In a radio having a radio frequency signal receiving means for receiving radio frequency broadcast signals, and digital signal processing means, receiving said radio frequency signals from said radio frequency signal receiving means, that requires a first amount of power to operate for converting the received broadcast signals into a first signal, an improvement comprising low power signal processing means:

operably coupled to the radio frequency signal receiving means and receiving radio frequency signals; and requiring a second amount of power, said second amount of power being less than the first amount of power;

for detecting a radio frequency broadcast signal of interest independent of the digital signal processing means and providing an enabling control signal to the digital signal processing means for activating the digital signal processing means to substantially control power consumption of the digital signal processing means.

3. In a radio having a radio frequency signal receiving means for receiving radio frequency broadcast signals, and a digital signal processing means, for processing said radio frequency signals that requires a first amount of power to operate for converting the received broadcast signal into a first signal, an improvement comprising:

A) switch means:

responsive to an enabling control signal; and being operably coupled between the signal receiving means and the digital signal processing means;

for selectively allowing the broadcast signals as received by the signal receiving to be provided to the digital signal processing means;

B) low power signal processing means:

operably coupled to the signal receiving means and receiving radio frequency signals from said signal receiving means; and requiring a second amount of power, said second amount of power being less than the first amount of power;

for detecting a radio frequency broadcast signal of interest independent of the digital signal processing means and providing the enabling control signal to the switch means and the digital signal processing means in response thereto for activating the digital signal processing means and allowing the received broadcast signals to be provided to the digital signal processing means.

4. In a radio having a radio frequency signal receiving means for receiving radio frequency broadcast signals, and digital signal processing means for processing radio frequency signals that requires a first amount of power to operate, when enabled, for converting the received broadcast signals into a first signal, an improvement comprising low power signal processing means:

operably coupled to the radio frequency signal receiving means and receiving radio frequency signals; and requiring a second amount of power, said second amount of power being less than the first amount of power;

for detecting a radio frequency broadcast signal of interest and providing an enabling control signal to the digital signal processing means in response to detecting the broadcast radio frequency of interest for activating the digital signal processing means to substantially control power consumption of the digital signal processing means.

* * * * *